(12) United States Patent
Friesen et al.

(10) Patent No.: US 9,761,920 B2
(45) Date of Patent: Sep. 12, 2017

(54) METAL-AIR ELECTROCHEMICAL CELL WITH HIGH ENERGY EFFICIENCY MODE

(75) Inventors: Cody A. Friesen, Fort McDowell, AZ (US); Ramkumar Krishnan, Gilbert, AZ (US); Todd Trimble, Phoenix, AZ (US); Joel Hayes, Chandler, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 867 days.

(21) Appl. No.: 13/083,929

(22) Filed: Apr. 11, 2011

(65) Prior Publication Data

US 2011/0250512 A1  Oct. 13, 2011

Related U.S. Application Data (60) Provisional application No. 61/323,384, filed on Apr. 13, 2010.

(51) Int. Cl.

| | |
|---|---|
| H01M 12/08 | (2006.01) |
| H01M 4/24 | (2006.01) |
| H01M 4/86 | (2006.01) |
| H01M 10/42 | (2006.01) |
| H01M 4/32 | (2006.01) |
| H01M 16/00 | (2006.01) |
| H01M 10/44 | (2006.01) |

(52) U.S. Cl.
CPC ............ *H01M 12/08* (2013.01); *H01M 4/24* (2013.01); *H01M 4/244* (2013.01); *H01M 4/32* (2013.01); *H01M 4/8615* (2013.01); *H01M 10/425* (2013.01); *H01M 10/44* (2013.01); *H01M 16/00* (2013.01); *H01M 2010/4271* (2013.01); *H01M 2300/0014* (2013.01); *Y02E 60/128* (2013.01)

(58) Field of Classification Search
CPC ...... H01M 12/08; H01M 4/24; H01M 4/8615; H01M 4/32; H01M 4/244; H01M 10/425; H01M 10/44; H01M 2010/4271; Y02E 60/28
USPC ........................................................ 429/406
See application file for complete search history.

(56) References Cited

U.S. PATENT DOCUMENTS

| | | | |
|---|---|---|---|
| 3,883,368 | A | 5/1975 | Kordesch et al. |
| 5,250,370 | A | 10/1993 | Faris |
| 6,127,061 | A * | 10/2000 | Shun et al. .................. 429/406 |
| 6,911,273 | B2 | 6/2005 | Faris |
| 8,168,337 | B2 | 5/2012 | Friesen et al. |
| 8,309,259 | B2 | 11/2012 | Friesen et al. |
| 2004/0146764 | A1 | 7/2004 | Tsai et al. |
| 2005/0031911 | A1 | 2/2005 | Venkatesan et al. |
| 2007/0141415 | A1 | 6/2007 | Yang et al. |
| 2009/0072625 | A1 * | 3/2009 | Oga .............................. 307/80 |
| 2010/0119895 | A1 | 5/2010 | Friesen et al. |
| 2010/0285375 | A1 | 11/2010 | Friesen et al. |
| 2010/0316935 | A1 | 12/2010 | Friesen et al. |
| 2011/0070506 | A1 | 3/2011 | Friesen et al. |
| 2011/0086278 | A1 | 4/2011 | Friesen et al. |
| 2011/0189551 | A1 | 8/2011 | Friesen et al. |

(Continued)

OTHER PUBLICATIONS

Chinese Office Action of Chinese Appln. No. 201120118553.9 dated Aug. 23, 2011, 4 pages (2 pgs CN, 2 pgs translation).

(Continued)

*Primary Examiner* — Eugenia Wang
(74) *Attorney, Agent, or Firm* — Pillsbury Winthrop Shaw Pittman LLP (57) ABSTRACT

The present invention relates to a metal-air electrochemical cell with a high energy efficiency mode.

47 Claims, 4 Drawing Sheets

(56) References Cited

U.S. PATENT DOCUMENTS

2011/0200893 A1 8/2011 Friesen et al.
2011/0250512 A1 10/2011 Friesen et al.
2011/0316485 A1 12/2011 Krishnan et al.
2014/0272477 A1 9/2014 West et al.

OTHER PUBLICATIONS

Intl Search Report/Written Opinion dated Sep. 5, 2011 of PCT/US2011/031973 filed Apr. 11, 2011 (13 pages).
Second Written Opinion of IPEA dated Aug. 22, 2012 of PCT/US2011/031973 filed Apr. 11, 2011 (9 pages).
Chinese Office Action dated Oct. 10, 2014 for Appln. No. 201180026382.X.
Chinese Office Action dated Apr. 8, 2015 for Appln. No. 201180026382.X.
Chinese Office Action dated Jul. 312, 2015 for Appln. No. 201180026382.X.

* cited by examiner

METAL-AIR ELECTROCHEMICAL CELL WITH HIGH ENERGY EFFICIENCY MODE

The present application claims priority to U.S. Provisional Appln. No. 61/323,384, filed Apr. 13, 2010, the entirety of which is hereby incorporated herein by reference.

FIELD OF THE INVENTION

The present invention relates to a metal-air electrochemical cell with a high energy efficiency mode.

BACKGROUND OF THE INVENTION

Rechargeable electrochemical cells are designed for charging to store input electrical current as energy, and discharging for outputting or releasing the stored energy as output electrical current. In certain applications, such cells may experience charge and discharge periods of varying length. These intervals can range between relatively long periods of time and very short periods of time (i.e., charge/discharge bursts). One example is a cell that stores energy from a solar cell field: charging may occur essentially uninterrupted during clear, sunny days, with extended periods of discharge at night, or charge and discharge cycles may be extremely short due to cloud cover interruptions. Similarly, a wind turbine may output uninterrupted power for charging during steady, continuous winds, but the power output may fluctuate if the presence of wind is interrupted. However, such electrochemical cells are optimized for one charge/discharge scenario, typically the longer charge/discharge cycle where reactant availability is more of a limiting factor than energy efficiency.

SUMMARY OF THE INVENTION

The present application provides an advantageous cell construction that is tailored to handle both long and short cycles of charge/discharge each in an effective and efficient manner.

One aspect of the invention provides a metal-air electrochemical cell for storing electrical energy from a power source and supplying electrical energy to a load. The cell comprises a plurality of electrodes comprising (i) a fuel electrode comprising a metal fuel and (ii) an air electrode for exposure to an oxygen source. An electrode of the plurality other than the fuel electrode [i.e. the air electrode or an additional electrode] comprises a reversible metal capable of reversible oxidation to a reducible species thereof and reduction to an oxidizable species thereof. Also, an electrode of the plurality other than the fuel electrode has an oxygen evolving functionality. For purposes of clarity, the number of electrodes could be two or more, as will be apparent from the embodiments described herein. The cell also comprises an ionically conductive medium for conducting ions among the plurality of electrodes.

A controller is configured to operate the cell in the following states:

(i) a standard recharge state wherein the power source is coupled to the fuel electrode and the oxygen evolving electrode for applying a potential difference therebetween to cause reduction of a reducible species of the metal fuel on the fuel electrode and evolution of oxygen from the ionically conductive medium at the oxygen evolving electrode;

(ii) a standard discharge state wherein the fuel electrode and the air electrode are coupled to the load such that oxidation of the metal fuel at the fuel electrode and reduction of oxygen from the oxygen source at the air electrode generates a potential difference for outputting current;

(iii) a high energy efficiency recharge state wherein the power source is coupled to the fuel electrode and the electrode comprising the reversible metal for applying a potential difference therebetween to cause reduction of a reducible species of the metal fuel on the fuel electrode and oxidizing the oxidizable species of the reversible metal, if present, to the reducible species thereof with the potential of the electrode comprising the reversible metal being cathodic of the potential for oxygen evolution; and (iv) a high energy efficiency discharge state wherein the fuel electrode and the electrode comprising the reversible metal are coupled to the load such that oxidation of the metal fuel at the fuel electrode and reduction of the reducible species of the reversible metal, if present, to the oxidizable species thereof generates a potential difference for outputting current with the potential of the electrode reversible metal being anodic of the potential for oxygen reduction at the air electrode.

An energy efficiency of the high energy efficiency discharge and recharge states is greater than an energy efficiency of the standard discharge and recharge states, each energy efficiency being the ratio of $q_{out}V_{out}/q_{in}V_{in}$.

In one non-limiting embodiment, the electrode comprising the reversible metal and the oxygen evolving electrode are the same electrode which is a tri-functional electrode separate from both the fuel electrode and the air electrode. Also, the controller is switchable between:

(i) a recharge state coupling the power source to the fuel electrode and the tri-functional electrode such that the recharge state includes (a) initially the high energy recharge state in which oxidation at the tri-functional electrode is predominated by oxidation of the oxidizable species of the reversible metal, if present, to the reducible species thereof with the potential of the tri-functional electrode being cathodic of the potential for oxygen evolution, and (b) then the standard recharge state in which the oxidation at the tri-functional electrode is predominated by evolution of oxygen from the ionically conductive medium;

(ii) the standard discharge state; and (iii) the high efficiency discharge state.

In another non-limiting embodiment, the electrode comprising the reversible metal and the oxygen evolving electrode are separate electrodes and are each separate from both the fuel electrode and the air electrode. Also, the controller is switchable between:

(i) the standard recharge state;
(ii) the standard discharge state;
(iii) the high efficiency recharge state; and
(iv) the high efficiency discharge state.

In yet another non-limiting embodiment, the air electrode, the electrode comprising the reversible metal and the oxygen evolving electrode are the same electrode which is a quad-functional electrode. The load is coupled to the fuel electrode and the quad-functional electrode in both the standard and high efficiency discharge states and the power source is coupled to the fuel electrode and the quad-functional electrode in both the standard and high efficiency recharge states. Also, the controller includes a regulator coupled to at least the quad-functional electrode to control the potential at the quad-functional electrode for setting its potential anodic of the potential for oxygen reduction during the high efficiency discharge state and cathodic of the potential for oxygen evolution during the high efficiency recharge state.

Thus, it can be seen that reference to electrodes and their functionality may be taken as individual electrodes in a structural sense or the role an electrode plays in a functional sense where a given electrode may play more than one function depending on the embodiment or context. For example, an electrode that pays multiple roles, such as oxygen evolution during standard re-charge and oxidation/reduction of the reversible metal during high efficiency re-charge/discharge, may be referenced to as the oxygen evolving electrode in reference to its function during standard re-charge and as the electrode comprising the reversible metal in reference to its function during high efficiency re-charge/discharge.

Other objects, aspects, and advantages of the present invention will become apparent from the following detailed description, the accompanying drawings, and the appended claims.

DETAILED DESCRIPTION

The present application discloses a metal-air electrochemical cell 10 with a high efficiency mode. The cell 10 may have any construction or configuration, and the examples described herein are not intended to be limiting. For example, the cell may be constructed in accordance with any one of the following patent applications, the entirety of each of which is incorporated herein by reference: Ser. Nos. 12/385,217, 12/385,489, 12/631,484, 12/549,617, 12/776, 962, 12/885,268, 12/901,410, 61/177,072, 61/243,970, 61/249,917, 61/301,377, 61/304,928, 61/329,278, 61/334, 047, 61/365,645, 61/378,021, 61/394,954, 61/358,339 and 61/267,240.

The cell 10 may be incorporated into a set of cells in series or in parallel, which may comprise a cell system. A set of cells 10 is shown schematically in FIG. 1, and the other Figures also show the cells schematically. It should be understood that one or more such cells 10 may be used in any type of cell system, such as a system of cells stacked in series or in parallel. The above-incorporated patent applications provide details of such systems and the construction of the individual cell(s), and those teachings need not be repeated herein.

Each cell 10 includes a fuel electrode 12 comprising a metal fuel. The fuel may be any type of fuel, and is preferably a fuel that may be electrodeposited on a conductive body of the electrode 12. A metal fuel may be any type of metal, and the term metal refers to metals in any form, including elemental metals, alloys, metal hydrides, and metals combined in any molecular or complexed form (e.g., oxides). Preferably, the fuel is zinc, but it may also be aluminum, manganese, magnesium, iron, or any other metal selected from the alkaline earth metals, transition metals, or post-transition metals. In some embodiments, alkali metals may be used also.

As is mentioned in the above-incorporated patent applications, the fuel electrode 12 may comprise a single body on which the fuel is reduced/electrodeposited, or it may comprise a series of spaced apart bodies on which the fuel is reduced/electrodeposited progressively or in parallel simultaneously, as discussed in some of the above-incorporated patent applications. Neither approach is intended to be limiting.

Using the zinc example, the oxidation half-cell reaction at the fuel electrode 12 during discharge in an alkaline electrolyte may be expressed as:

$$Zn + 4OH^- \rightarrow Zn(OH)_4^{2-} + 2e^- \qquad (1)$$

In solution, the zincate ion may further react to form zinc oxide as follows:

$$Zn(OH)_4^{2-} \rightarrow ZnO + H_2O + 2OH^- \qquad (2)$$

As can be appreciated, the oxidation of zinc to zinc oxide (or zinc to zincate if it remains dissolved in the solution) is reversible, and thus these reactions may occur in reverse during re-charge to electrodeposit the zinc on the fuel electrode 12, as will be discussed below, and as is also discussed in the above-incorporated patent applications in detail. Where the metal fuel is a metal hydride, the reduction/oxidation may be of the hydrogen component of the metal fuel bonded to the metal component.

Each cell 10 also includes an air electrode 14, also referred to as an air cathode, exposed to an oxygen source. The oxygen source is preferably ambient air, and thus the air electrode has a face surface exposed to the ambient air for absorbing the gaseous molecular oxygen ($O_2$) therefrom. This enables the air electrode 14 to reduce the absorbed oxygen to support the electrochemical reactions during the standard discharge mode or state of the cell 10, which will be described below. The air electrode 14 is preferably permeable to air, but impermeable to liquid, and particularly the electrolyte solution contained within the cell 10. This allows the air to permeate the body of the air electrode 14, without leakage of the electrolyte therethrough. Preferably, the air electrode 14 is made from a polymer, a catalyst, a catalyst support, and a current conducting material. Examples of the materials are: polytetrafluoroethylene, polypropylene, or polyethylene for the polymer; nickel, manganese oxide, cobalt porphyrins, or rare earth oxides for the catalyst; and carbon, nickel, and/or copper for the current conducting and/or catalyst support material. Further details concerning the air electrode 14 may be appreciated from the above-incorporated patent applications.

During discharge, the reduction half-cell reaction at the air electrode 14 may be expressed as:

$$2e^- + \tfrac{1}{2}O_2 + H_2O \rightarrow 2OH^- \qquad (3)$$

The cell 10 also includes an oxygen evolving electrode 16 (also referred to as a charging electrode). The oxygen evolving electrode 16 enables oxygen evolution during recharging of the cell 10. That is, the oxygen evolving electrode 16 may be held at a potential at which hydroxide ions in the electrolyte are oxidized to form oxygen, which may be off-gassed from the cell 10 or collected and circulated for consumption by the air electrode 14. This is often referred to as water oxidation, as the hydroxide ions are available from water.

The oxidation half-cell reaction occurring at the oxygen evolving electrode during oxygen evolution during re-charging may be expressed as:

$$2OH^- \rightarrow 2e^- + \tfrac{1}{2}O_2 + H_2O \qquad (4)$$

And the corresponding reduction half-cell reaction occurring at the fuel electrode 12 may be expressed as:

$$Zn(OH)_4^{2-} + 2e^- \rightarrow Zn + 4OH^- \qquad (5)$$

An alkaline electrolyte solution is included in the cell 10 for conducting ions among the electrodes 12, 14, 16, such as potassium hydroxide (KOH) dissolved in water. The alkaline electrolyte may be a liquid or a gel. Gelling agents may include, for example, starch, carboxymethyl cellulose, or polyvinyl alcohol crosslinked with formaldehyde. Other electrolytes, such as acidic, non-aqueous, or low or room temperature ionic liquid electrolytes, may be used. The cell 10 is enclosed in a housing (not shown) as is well known. The electrolyte may be circulated through the cell 10, through a plurality of cells 10 in fluidly connected series, or it may be static and non-flowing. Further details for the management of flow for the electrolyte, if used, may be found in the above-incorporated patent applications.

The foregoing description of a metal-air cell 10 is conventional, as the above-described discharging (i.e., oxidation of metal fuel 12 at the fuel electrode and reduction of oxygen at the air electrode 14) and recharging (i.e., reduction of metal fuel on the fuel electrode 12 and evolution of oxygen at the oxygen evolving electrode 16) are known. These may be referred to as standard discharge and recharge states or modes of operation, respectively. A primary advantage of this conventional cell design and supporting reactions is that oxygen availability is generally not a limiting factor, particularly when the oxygen is derived from ambient air. During re-charging, the evolved oxygen can be off-gassed from the cell 10 relatively easily, so that its accumulation does not retard the re-charging half-cell reaction at the oxygen evolving electrode 16. The oxygen may optionally be off-gassed through the air permeable air electrode 14. The structure of the air electrode 14 and the oxygen evolving electrode 16 may be constructed with varying pore diameters and varying hydrophobicity such that the off-gassing air bubbles are directed through the air exposed face of the air electrode 14, away from the fuel electrode 12. Likewise, because oxygen is readily available, particularly in ambient air, its availability for supporting the half-cell reaction at the air electrode 14 during discharge is not regarded as a limiting factor.

A significant trade-off of using oxygen in the half-cell reactions at the air electrode 14 during discharge and the oxygen evolving electrode 16 during recharge is in energy efficiency. Energy efficiency is the ratio of $q_{out}V_{out}/q_{in}V_{in}$, where q is the measure of charge stored (in) or withdrawn (out) and V is the potential difference between the relevant electrodes at which the charge is stored or withdrawn. However, when the charge and discharge periods last for relatively long durations of time, energy efficiency is less of an issue than the availability of reactants (energy density). It is during short durations of charge and discharge (i.e., "bursts") that energy efficiency is more of an issue, as the reactants are being consumed/reconstituted at a more frequent rate, and thus availability is less of an issue.

To put these competing factors in context, consider the example of a solar cell field, where a system of the cells 10 are used to store energy discharged from the solar cells during power generation when the solar cells are exposed to the sun, and are used to discharge the stored energy to a power grid when the solar cells are not exposed the sun, and thus not generating power. For a cloudless day, the field of solar cells may be able to continuously generate energy for 10-14 hours under continual exposure to solar radiation. Some of that energy may be delivered to the power grid, and the excess energy may be stored by the cells 10. As such, the cells 10 can be designed such that sufficient fuel is available within the cells 10 to store that excess energy, and the supply of oxygen in ambient air as the oxidant is effectively limitless. At night, the cells 10 can be operated to discharge that stored excess energy to a power grid, thus providing electricity derived from the solar cell field even when the solar cells themselves are not generating power.

But on a cloudy day with numerous clouds passing over and frequently interrupting the sunlight, the situation is much different. These intermittent clouds may interrupt the solar cells' ability to deliver electricity, but grid demand for electricity does not necessarily fluctuate at these frequencies or in sync with the weather. Thus, the electricity is drawn from the cells 10 instead. These interruptions may come in short bursts, such as on the order of 2-10 minutes for example, as patches of clouds repeatedly block the sun and then move on and allow the sun to shine on the solar cells. In such a situation, reactant availability is much less of an issue, as re-charging and discharging of the cells 10 is occurring at a relatively high frequency. In this situation, energy efficiency is more significant of an issue, as it is desirable for the cells 10 to store and discharge as much energy as possible during such short periods of time.

As can be appreciated, this situation of short burst activity where high energy efficiency is more of an issue than reactant availability can arise in other contexts. For example, wind farms may experience similar behavior. Likewise, rechargeable electric/hybrid vehicles may have long periods of re-charge (e.g., overnight), but may also have short burst periods of re-charge, such as between uses during the day. Thus, the solar cell field is provided as an example for understanding the context of the present invention, but is not intended to be limiting.

In one embodiment, to accommodate these short burst situations, the oxygen evolving electrode 16 may comprise (i.e., may include at least one) a metal capable of energy efficient reversible oxidation to a reducible species and reduction to an oxidizable species within the cell 10 to support a high energy efficiency mode or state of operation. This may be referred to as a high energy efficiency metal or reversible metal for convenience. The terms oxidizable species and reducible species are used to denote the species or states of the high energy efficiency metal relative to one another and their respective half-cell reactions during re-charge and discharge, as will be discussed below. The same definition of metal used above, i.e., including metal oxides, alloys, pure/elemental metals, hydrides, etc. applies equally here to the reversible metal.

Preferably, the high energy efficiency metal is a metal oxide, such as a nickel species as a non-limiting example, which may be reversibly oxidized and reduced between states thereof. For example, the nickel species may be reversibly oxidized/reduced between nickel (II) hydroxide and nickel (III) oxyhydroxide, and this functionality is used to support the high energy efficiency modes, as will be described below. Because the high energy efficiency metal is supporting short, high frequency bursts of activity, reversibility is highly advantageous and it allows the metal to repeatedly store and discharge energy. Also, the high energy efficiency metal, e.g., its nickel content, may serve as a surface for supporting the oxidation of hydroxide ions during standard cell charging, off-gassing oxygen as the electrode functions as an oxygen evolving electrode. The oxygen evolving electrode may be a porous material made from a polymer and a high efficiency metal. Examples of the materials are polytetrafluoroethylene, polypropylene, or polyethylene for the polymer; a nickel species for the high energy efficiency metal; and possibly carbon as a support material.

Nickel is not limiting, and another metal or combination of metals may be used to provide the reversibility/high energy efficiency functionality. Also, one or more other metals, such as a catalyst metal, may be added to enhance the oxygen evolving functionality, and the relative content/ratio of metals used may be tailored to specific applications as desired. For example, in certain applications it may be desirable to have more of the reversible metal(s) present to store more energy during high efficiency recharging as discussed below, and in other situations less may be needed and it may be more desirable to dedicate more of the active metal component to the oxygen evolving functionality.

Thus, during high energy efficiency re-charging, half-cell reaction (5) takes place at the fuel electrode 12, and the high energy efficiency nickel species may be oxidized from nickel(II) hydroxide (its oxidizable species) to nickel (III) oxyhydroxide (its reducible species), which may be expressed as:

$$2Ni(OH)_2 \rightarrow 2NiOOH + 2H^+ + 2e^- \quad (6)$$

The hydrogen cations may react with an OH⁻ ion in the electrolyte to form water (H$_2$O).

Similarly, during high energy efficiency discharging, instead of using the air cathode 14 as the counterelectrode to the fuel electrode 12, the oxygen evolving electrode 16 may be used with the nickel (III) oxyhydroxide (its reducible species) being reduced back to nickel (II) hydroxide (its oxidizable species). The half-cell reaction at the fuel electrode is above at equation (1), and the half-cell reaction at the oxygen evolving electrode 16 may be expressed as follows:

$$2NiOOH + 2H^+ + 2e^- \rightarrow 2Ni(OH)_2 \quad (7)$$

The advantage of this cell design, particularly with respect to the design of the oxygen evolving electrode 16, is that the reduction-oxidation of the high energy efficiency nickel species has a high energy efficiency when coupled to the fuel electrode 12, as compared to the oxidation of water/hydroxide ions to evolve oxygen at the oxygen evolving electrode 16 and the reduction of oxygen at the air cathode 14. Thus, the electrode 16 may be described as being tri-functional, as it can perform the functions of (a) oxidizing hydroxide ions in the electrolyte to evolve oxygen during standard re-charging, (b) oxidizing its own reversible metal during high energy efficiency mode re-charging, and (c) reducing its reversible metal during high energy efficiency mode discharging.

Figure 4:
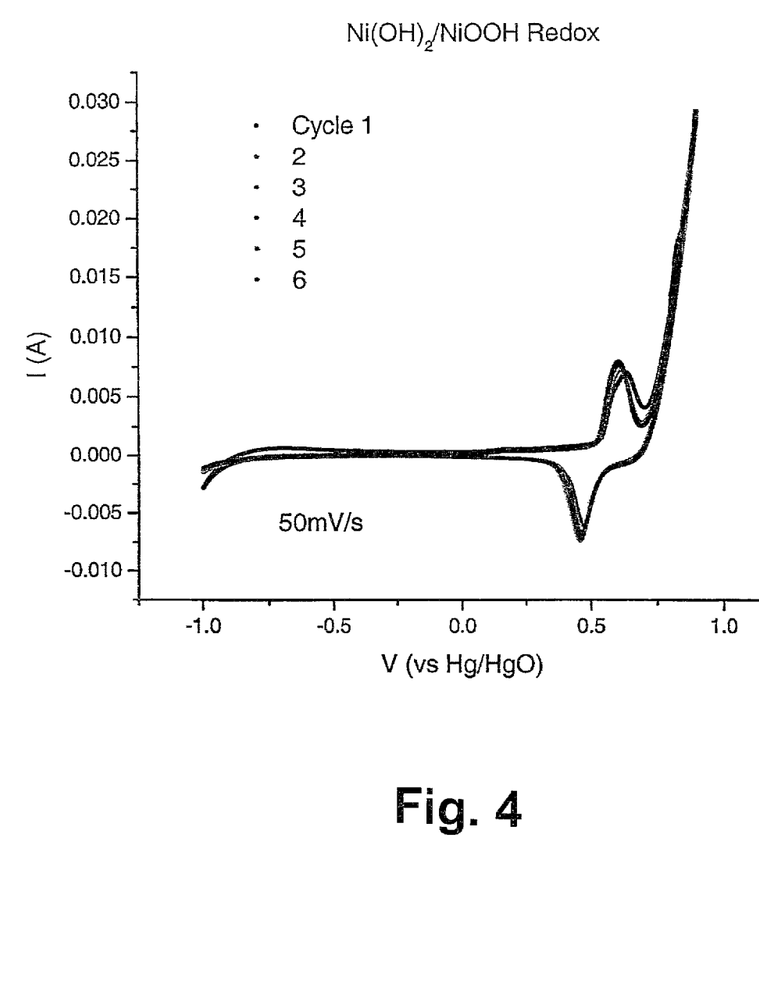
FIG. 4 shows a plot to illustrate energy efficiency.

As can be appreciated from the graph included in FIG. 4, because the current density (which is directly correlated to charge in and charge out) is relatively similar for both the oxidation and reduction of the nickel species, and the potentials at which these occur (and particularly the peaks where current density is maximized) are relatively close, the energy efficiency is relatively high, in the range of 75% to 95%. More preferably, the energy efficiency is in the range of 80% to 90%, or more preferably it is about 87%. However, because there is only a limited amount of nickel available, its availability as a reactant is limited, thus presenting the constraints on its use for long term reactions as discussed above. Moving to the right of the Figure, the asymptotic behavior of the line denotes the domain in which oxygen evolution is occurring during standard re-charging. Thus, fuel reduction and oxygen evolution occur at a greater potential difference than fuel reduction and nickel species oxidation, because the potential at the oxygen evolving electrode 16 for nickel species oxidation is cathodic of the potential for oxygen evolution. In addition, the potential difference between fuel oxidation and oxygen reduction (at air cathode 14) during discharge is significantly lower than the potential difference between fuel oxidation and the nickel species reduction (at the oxygen evolving electrode 16), because the nickel species reduction at the oxygen evolving electrode 16 occurs at a potential anodic of the oxygen reduction at the air cathode 12. This means that the energy efficiency is significantly lower for the same amount of charge stored (in) versus drawn (out).

In the standard discharge state, the fuel electrode 12 and the air electrode 14 are coupled to a load (e.g., the power grid), so that oxidation of the fuel and reduction of the oxygen generates a potential difference applied to the load. During re-charging, a power source (e.g, solar cells, wind turbines, etc.) is coupled to the fuel electrode 12 and the oxygen evolving electrode 16. This causes two phases or states of re-charging to occur, with reduction of fuel onto the fuel electrode occurring in both phases. Initially, if the high energy efficiency metal (e.g., the nickel species discussed above) has not already been oxidized and thus its oxidizable species is present, that oxidizable metal species will be oxidized to the reducible species thereof (e.g., nickel (II) hydroxide is oxidized to nickel (III) oxyhydroxide). This may be referred to as a high energy recharge phase or state. Then, the oxidation reaction will transition to oxidation of hydroxide ions to evolve oxygen, which may be referred to as a standard recharge phase or state. This occurs because the oxidation of the high energy efficiency metal is typically more facile, and occurs in preference to the evolution of oxygen. But as the oxidizable species of the high energy efficiency metal is fully oxidized to its reducible species, oxygen evolution will take over (and occurs in preference to further oxidation of the high energy efficiency metal to its subsequent oxide state). Collectively, because these two phases or states transition, they can be considered together a recharge state with an initial high energy efficiency recharge state or phase and then a standard recharge state or phase. The transition between the high energy and standard phases of the recharge state is not necessarily binary, as oxygen evolution may occur as the reducible species is oxidized, particularly if oxidation is completed in certain regions of the electrode before other regions (as may occur in a highly porous structure, for example). Thus, the phases may be characterized by the oxidation reaction that is predominant (either metal oxidation is occurring more significantly than oxygen evolution, or vice versa). In the high energy efficiency discharge state, the load drawing power is coupled to the fuel electrode 12 and the oxygen evolving electrode 16, so that oxidation of the fuel and reduction of the reducible species of the metal high energy efficiency metal of the oxygen evolving electrode to its oxidizable species (e.g., nickel (III) oxyhydroxide is reduced to nickel (II) hydroxide) generates a potential difference applied to the load.

As an example to illustrate the energy efficiency benefit using zinc as the fuel, a nickel species as the high energy efficiency material in the oxygen evolving electrode, oxygen as the oxidant, and an alkaline potassium hydroxide aqueous electrolyte solution, the energy efficiency ($q_{out}V_{out}/q_{in}V_{in}$) for the standard discharge state and the standard re-charge phase of the recharge state may be in the range of 35% to 65%, and preferably is about 50%. In contrast, the energy efficiency of the high energy efficiency discharge state and the high energy efficiency phase of the re-charge state may be in the range of 75% to 95%, and preferably is at least about 87%. As can be seen, the energy efficiency for the high energy efficiency operations is significantly higher than the energy efficiency for the standard operations, preferably by a factor of 1.7, and more preferably by a factor of at least 2. This advantage is driven primarily by virtue of there being a smaller difference between the potential differences for the fuel oxidation/nickel (III) oxyhydroxide reduction ($V_{out}$) and the fuel reduction/nickel (II) hydroxide oxidation ($V_{in}$) than for the fuel oxidation/oxygen reduction ($V_{out}$) and the fuel reduction/oxygen evolution ($V_{in}$).

In this embodiment no switching between electrode couplings is required during re-charging, since the same electrodes are involved irrespective of whether oxidation of the high energy efficiency metal or the evolution of oxygen is occurring at the oxygen evolving electrode 16. For the different discharge states, switching takes place between coupling the load to the oxygen evolving electrode 16 and the air cathode 14 (the fuel electrode 12 is always coupled to the load during discharge). This switching may occur under the controller of a controller, which may include one or more switches 20 for selectively coupling the oxygen evolving electrode 16 or the air cathode 14 to the load during discharging to switch between the standard and high efficiency discharge states, and may also selectively couple the oxygen evolving electrode 16 to the power source for high efficiency and standard recharging. The switches 20 may be of any type, including mechanical, semiconductor or any other type of switch. A capacitor/auxiliary battery may also be used to provide power/energy between switching from a high energy efficient mode to standard mode during discharge.

Figure 1:
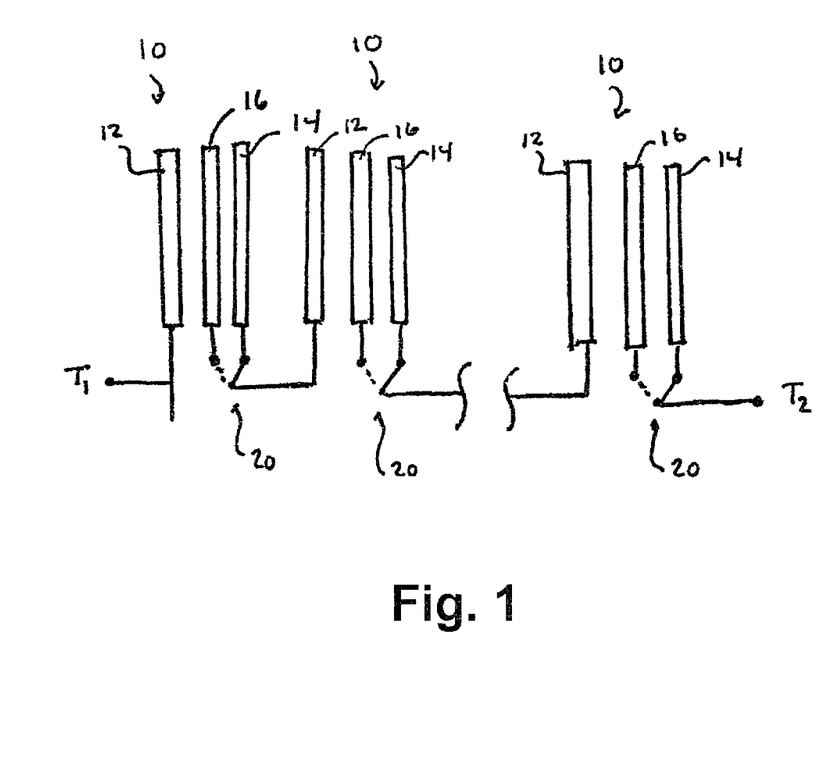
FIG. 1 schematically illustrates a first embodiment of the present invention.

FIG. 1 shows the switches 20 as being simply two-state switches, such as double-pole, single-throw switches. The system has opposite output terminals T1 and T2, which may be selectively coupled to a load (during discharge) or a power source (during recharge). Each switch has its throw or contact element statically coupled to the subsequent element in the system. Thus, the contact element of each of the $1^{st}$ to N−1th cells (for N cells) would be statically coupled to the subsequent cells, and the contact element of the Nth cell is statically coupled to the terminal T2. The contact elements or throws are shown in the normal position for the standard discharge state, coupled to the contact that connects to the air electrode 12. For recharging (with the terminals coupled to a power source) or high efficiency discharging (with the terminals coupled to a load), the contact elements or throws would be moved to the positions indicated by dashed lines, thus being coupled to the contact that connects to the oxygen evolving electrode 16. This allows the reactions to take place between the fuel electrodes 12 and the oxygen evolving electrodes 16 as discussed above. Any structure may be used, and the illustrated one is shown schematically and is not intended to be limiting.

The controller determines whether to switch between charging and recharging in general in any suitable matter, and various controls, logics, schemes, and/or algorithms determining predicted or actual power inflow or outflow are known, and need not be detailed herein. With respect to making a determination between standard discharging (fuel electrode—air cathode) and high energy efficiency discharging, any control, logic, scheme and/or algorithm may be used.

In one embodiment, the controller may simply be designed to couple the load to the fuel electrode 12 and oxygen evolving electrode 16 (the high efficiency discharge mode) initially for a period of time during discharge, and then switch to coupling the load to the fuel electrode 12 and the air cathode 14 (the standard discharge mode) in all instances. The rationale would be that any subsequent recharging will initially re-oxidize the high energy efficiency metal during recharging irrespective of whether the power output to the load was for a short or long period of time, and thus there is no need to specifically determine whether the load demand is better suited for high energy or standard discharging. The period of time for switching the coupling during discharge may be pre-set, or may be determined by monitoring a voltage, current or power drop indicative of less high energy efficiency metal being available for reduction.

In another embodiment, one or more other parameters may govern whether to couple the load to the air cathode 14 or the oxygen evolving electrode 16 during discharging. For example, in a solar cell context a clock or timer may provide a signal indicating the time of day, and during the day it can be expected that interruptions in sunlight are likely to be intermittent, whereas at night it is known the lack of sunlight will be continuous. Thus, the controller may opt during discharge to initially couple the load to the oxygen evolving electrode 16 for a period of time during daylight hours before switching to the air cathode, but skip coupling the load to the oxygen evolving electrode 16 during nighttime hours (what is regarded as daylight and nighttime hours may vary geographically and seasonally). Similarly, with wind turbines, continuous winds may be prevalent during certain times of the day, intermittent gusts may be prevalent during others, and calm conditions may be prevalent in others; thus similar determinations may be made as to whether to use the high energy efficiency discharge mode or not. Similar considerations may be made with respect to vehicle battery charging, as nighttime charging tends to be for longer periods of time, and daytime charging tends to be shorter, largely because cars are driven more during the daytime.

These examples of the controller logic relative to selecting between standard discharging and high energy efficiency discharging are not intended to be limiting.

The controller may include a microprocessor, or may be made of more basic circuit elements, and no particular type of controller is regarded as limiting. The term controller is a generic structural term, and not intended to be limiting. The controller need not be limited to a single component, and the controller's operations may be distributed among several components, such as multiple processors, regulators, or circuits, that operate separately from one another or in concert.

The cell may be in a series of cells electrically coupled together in series. In such an arrangement, the switching arrangements disclosed in U.S. Provisional Application No. 61/243,970 and Ser. No. 12/885,268 (incorporated above) may be used to manage the series connections and switching between coupling to the air cathode 14 and the oxygen evolving electrode 16, as well as any bypassing of malfunctioning cells.

The system of any cell in the embodiment of FIG. 1 may also include a current, power, or voltage regulator as part of the controller. The regulator may be used to initially maintain the potential of the oxygen evolving electrode 16 during recharging at a level for nickel species oxidation and cathodic of the potential for oxygen evolution to ensure that the high efficiency recharging of the nickel content takes place. Generally, the nickel species oxidation will take preference to oxygen evolution because it occurs at a lower potential difference. However, an excess amount of power may drive the potential difference higher, causing oxygen evolution to occur instead. Thus, in systems where such excess power levels may occur, a regulator may be used for an initial predetermined period at the onset of recharging to maintain the potential of the oxygen evolving electrode at such a level. A single current, voltage or power regulator may be coupled to one of the terminals to control the current flow through the cell and/or voltage of the cell, or individual regulators, such as individual voltage regulators, may be associated with each individual cell 10.

Figure 2:
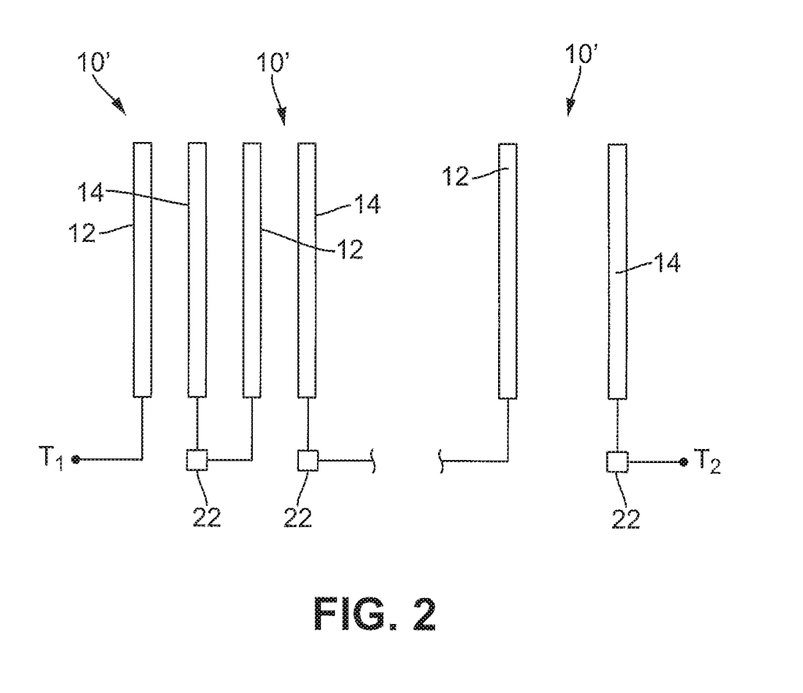
FIG. 2 schematically illustrates a second embodiment of the present invention.

In another embodiment where the cell is denoted 10' in FIG. 2, the separate oxygen evolving electrode may be eliminated from the cell 10', and the air electrode 14 may have a quad-functional role. Specifically, the quad-functional air electrode 14 may be designed to support the functions of (a) oxygen reduction during standard discharging, (b) oxygen evolution during standard re-charging, and (c) oxidation during high energy efficiency discharging, and (d) reduction during high energy efficiency re-charging.

In this quad-functional embodiment, the electrode 14 may be formed of a polymer to bind the materials and optionally serve as a hydrophobic component, a current conducting component, a catalyst for supporting oxygen reduction, and the reversible or high efficiency metal, such as a high surface area nickel to form nickel (III) oxyhydroxide and nickel (II) hydroxide. The electrode may include several porous layers: (a) a hydrophobic air side layer to allow air permeation and prevent electrolyte leakage; (b) a semi-hydrophobic catalyzed active layer for oxygen reduction; (c) a hydrophilic nickel containing layer for oxygen evolution and for formation of nickel (III) oxyhydroxide and nickel (II) hydroxide; (d) a current conducting layer; and (e) a porous hydrophilic layer with pore sizes designed to prevent penetration of oxygen bubbles into the electrolyte gap during oxygen evolution.

With the quad-functional electrode 14, during re-charging, the oxidizable nickel species, if present, may be initially oxidized to its reducible species in preference to oxygen as a high efficiency recharge state. One example of such oxidation is the reversible oxidation of nickel (II) hydroxide to nickel (III) oxyhydroxide, as discussed above. After the nickel species has been oxidized, the hydroxide oxidation (i.e., oxygen evolution) will begin to take place at its more anodic potential as a continued re-charging potential is applied between the fuel electrode 12 and the air electrode 14 as a standard recharge state. Likewise, during discharge, the reducible nickel species, if present, is initially reduced to its oxidizable species in preference to oxygen as a high energy efficiency discharge state, which reduction may be the reversible reduction of nickel oxyhydroxide back to nickel (II) hydroxide, as discussed above. After the nickel species has been reduced, the oxygen reduction will begin to take place at a more cathodic potential to continue generating a potential difference between the fuel electrode 12 and the air electrode 14 as a standard discharge state. Because the nickel oxidation and reduction half-cell reactions typically occur in preference to the oxygen oxidation and reduction half-cell reactions, this enables the nickel species to be the reactant opposite the fuel during short burst activity, which enables it to have a higher energy efficiency. For longer re-charge and discharge cycles, after the availability of the nickel species for its half-cell oxidation/reduction reactions has been depleted, the less energy efficient oxygen oxidation and reduction half-cell reactions predominate, albeit with reactant availability being less of a factor. It should be understood that, because these reactions are occurring at the same air electrode, there may be transition between efficiency and standard states and thus they may be characterized by the predominant half-cell reaction at the electrode 14.

Thus, the same or similar efficiency advantages described above with respect to the embodiment of FIG. 1 may be achieved with this embodiment, and need not be repeated.

A regulator 22, such as a voltage regulator, may be coupled to the air electrode 14 of each cell 10. The voltage regulator may be used to control the potential at which the relevant reaction occurs at the air electrode 14. Specifically, the voltage regulator 22 may be used to control the potential at the air electrode 14 during discharge, thus selectably controlling whether high efficiency (nickel species reduction) or standard (oxygen reduction) discharging is occurring. This is desirable to ensure that, during periods where standard discharging is preferred, the nickel species is not fully reduced, thus depleting its availability in the event a period of high efficiency recharging/discharging cycles is desired, and also to ensure that the high efficiency nickel species reduction occurs in preference to oxygen reduction during periods when high efficiency discharging is desired. The voltage regulators may have any construction and are well known, and the controller may be designed to manage the voltage regulators using the same types of logic, parameter, algorithms, etc. discussed above for controlling the switches in the embodiment of FIG. 3. The voltage regulator may also control the electrode 14's potential at which recharging occurs in the event of excess power, as discussed above with respect to the embodiment of FIG. 1.

In another embodiment, instead of using the separate electrode for both oxygen evolution and high energy efficiency oxidation/reduction of its high energy efficiency metal, these two functionalities could be divided between two different electrodes. Thus, the cell 10", shown in FIG. 3, would have (i) the metal fuel electrode 12, (ii) the air electrode 14 for reducing oxygen during standard discharging, (iii) an oxygen evolving electrode 18 for oxidizing hydroxide ions and evolving oxygen during standard re-charging, and (iv) a "high energy efficiency" electrode 19 with a reversibly reducible/oxidizable high energy efficiency metal, such as nickel, capable of energy efficient reversible oxidation and reduction within the cell 10 to support the high energy efficiency discharging and re-charging. Thus, the functionality of the tri-functional electrode 16 of the first embodiment may be distributed over two separate electrodes, namely the latter two ones 18, 19 mentioned.

Figure 3:
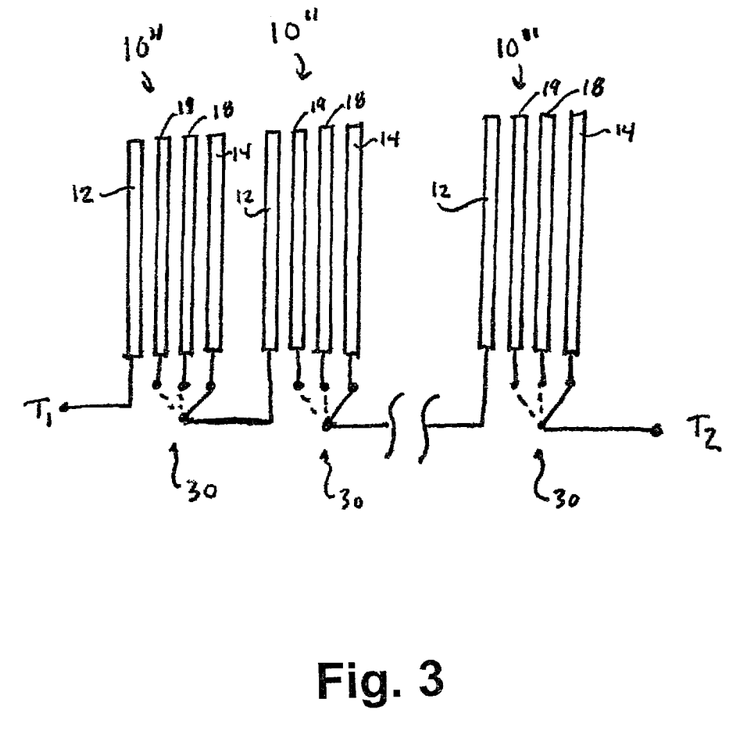
FIG. 3 schematically illustrates a third embodiment of the present invention.

In such an embodiment, during standard discharging, the operation takes place as described above with respect to the first embodiment. That is, the fuel is oxidized at the fuel electrode 12, and oxygen is reduced at the air cathode 14 during a standard discharging state, thus generating a potential difference therebetween for outputting a current to a load. During a standard re-charging state, a potential from a power source is applied between the fuel electrode 12 and the oxygen evolving electrode 18, thus reducing the reducible fuel species from the electrolyte and electrodepositing it on the fuel electrode, and oxidizing hydroxide ions from the electrolyte to evolve oxygen which may be off-gassed. During a high energy efficiency discharging state, the fuel is still oxidized at the fuel electrode 12, but the corresponding reduction reaction takes place via the reduction of the reducible species of the high energy efficiency metal (e.g., nickel) comprising the high energy efficiency mode electrode 19 to its oxidizable species; thus the potential difference is generated between the fuel electrode 12 and the high energy efficiency mode electrode 19 for outputting a current to a load. When a nickel species is used, this reaction may be the same as described above, namely the reduction of nickel (III) oxyhydroxide to nickel(II) hydroxide. Similarly, during a high energy efficiency re-charging state, a potential from a power source is applied between the fuel electrode 12 and the high energy efficiency mode electrode 19. Thus, the fuel is reduced from the electrolyte and electrodeposited on the fuel electrode 12, and oxidizable species of the high energy efficiency metal of the high energy efficiency mode electrode 19 is oxidized to its reducible species. When a nickel species is used as the metal, this reaction may be the same as described above, namely the oxidation of nickel (II) hydroxide to nickel (III) oxyhydroxide. The controller may be switched between different states managing these connections and modes/states.

Similar to the embodiment of FIG. 1, the embodiment of FIG. 3 includes switches 30 for managing the connections to the air electrode 14, oxygen evolving electrode 18, and high efficiency electrode 19. The position of these switches 30 is managed by the controller as discussed above, and the decisions on the states of these switches may be made in a manner similar to that described above with respect to the embodiment of FIG. 1. The switches may have any construction or configuration, and those shown are examples and not intended to be limiting. The illustrated switches 30 are each triple pole/single throw switches. Each switch 30 has a static contact coupled to contact element/throw and the subsequent element in the circuit; that is, the static contacts for switches for cells 1 to N−1 are coupled to the fuel electrodes 12 of the subsequent cells 10″, and the static contact for the Nth cell is coupled to the terminal T2, similarly to the switches in FIG. 1. The switches 30 also include three selective contacts, one coupled to the air electrode 14, one coupled to the oxygen evolving electrode 18, and one coupled to the high efficiency electrode 19. For standard discharging, the contact element/throw connects to the contact for the air electrode 14. For standard recharging, the contact element/throw connects to the contact for the oxygen evolving electrode 16. In both high efficiency discharging and recharging, the contact element/throw connects to the contact for the high efficiency electrode 19 (the difference being whether the terminals T1 and T2 are coupled to a load or a power source, respectively).

The embodiment of FIG. 3 may also include the bypass switching features mentioned above with respect to FIG. 1, as shown in U.S. Patent Application No. 61/243,970 and Ser. No. 12/885,268 (incorporated above). The embodiment of FIG. 3 may also include one or more optional regulators as discussed above with respect to the embodiment of FIG. 1 to ensure that excess power delivered during high efficiency recharging does not drive the potential of the high efficiency electrode 19 out of the domain of nickel species oxidation.

Thus, the same or similar efficiency advantages described above with respect to the embodiment of FIG. 1 may be achieved with this embodiment and need not be repeated.

As used herein, the term "high," as in "high energy efficiency," is a relative term meaning the energy efficiency is higher than in the corresponding standard mode, phase or state. Thus, the term "high" should not be taken as a general qualitative term.

The foregoing illustrated embodiments are provided solely to illustrate the structural and functional principles of the present invention and are not intended to be limiting. To the contrary, the scope of the invention encompasses all modifications, alterations, substitutions, and additions within the spirit and scope of the following claims.

What is claimed:

1. A metal-air electrochemical cell for storing electrical energy from a power source and supplying electrical energy to a load, comprising:
   a plurality of electrodes comprising a fuel electrode comprising a metal fuel and an air electrode for exposure to an oxygen source, wherein an electrode of the plurality other than the fuel electrode and the air electrode comprises a reversible metal capable of reversible oxidation to a reducible species thereof and reduction to an oxidizable species thereof, and wherein an electrode of the plurality other than the fuel electrode and the air electrode has an oxygen evolving functionality;
   the fuel electrode being separate from the other said electrodes, and the air electrode being separate from the other said electrodes;
   an ionically conductive medium for conducting ions among the plurality of electrodes;
   the oxidizable species of the reversible metal being oxidizable to the reducible species at a potential cathodic of the potential for oxygen evolution, and the reducible species being reducible to the oxidizable species at a potential anodic of the potential for oxygen reduction at the air electrode;
   one or more switches coupled to the air, oxygen evolving and reversible metal electrodes for selective connection to and disconnection from the power source and load to establish the following states of operation for the cell:
   (i) a standard recharge state wherein the power source is coupled to the fuel electrode and the oxygen evolving electrode for applying a potential difference therebetween to cause reduction of a reducible species of the metal fuel on the fuel electrode and evolution of oxygen from the ionically conductive medium at the oxygen evolving electrode;
   (ii) a standard discharge state wherein the fuel electrode and the air electrode are coupled to the load such that oxidation of the metal fuel at the fuel electrode and reduction of oxygen from the oxygen source at the air electrode generates a potential difference for outputting current;
   (iii) a high energy efficiency recharge state wherein the power source is coupled to the fuel electrode and the electrode comprising the reversible metal for applying a potential difference therebetween to cause reduction of a reducible species of the metal fuel on the fuel electrode and oxidizing the oxidizable species of the reversible metal, if present, to the reducible species thereof with the potential of the electrode comprising the reversible metal being cathodic of the potential for oxygen evolution; and
   (iv) a high energy efficiency discharge state wherein the fuel electrode and the electrode comprising the reversible metal are coupled to the load such that oxidation of the metal fuel at the fuel electrode and reduction of the reducible species of the reversible metal, if present, to the oxidizable species thereof generates a potential difference for outputting current with the potential of the electrode reversible metal being anodic of the potential for oxygen reduction at the air electrode;
   wherein an energy efficiency of the high energy efficiency discharge and recharge states is greater than an energy efficiency of the standard discharge and recharge states, each energy efficiency being the ratio of $q_{out}V_{out}/q_{in}V_{in}$; and
   a controller comprising logic configured to switch the one or more switches to operate the cell in the aforesaid states.

2. A metal-air electrochemical cell according to claim 1, wherein the electrode comprising the reversible metal and the oxygen evolving electrode are the same electrode which is a tri-functional electrode separate from both the fuel electrode and the air electrode; and wherein the one or more switches are switchable by the controller between the following states of operation for the cell:
(i) a recharge state coupling the power source to the fuel electrode and the tri-functional electrode such that the recharge state includes (a) initially the high energy recharge state in which oxidation at the tri-functional electrode is predominated by oxidation of the oxidizable species of the reversible metal, if present, to the reducible species thereof with the potential of the tri-functional electrode being cathodic of the potential for oxygen evolution, and (b) then the standard recharge state in which the oxidation at the tri-functional electrode is predominated by evolution of oxygen from the ionically conductive medium;
(ii) the standard discharge state; and
(iii) the high efficiency discharge state.

3. A metal-air electrochemical cell according to claim 2, wherein the reversible metal is a nickel species.

4. A metal-air electrochemical cell according to claim 3, wherein the oxidizable species of the nickel is Ni(OH)$_2$ and the reducible species of the nickel is NiOOH.

5. A metal-air electrochemical cell according to claim 4, wherein the fuel is selected from the group consisting of an alkaline earth metal, a transition metal, and a post-transition metal.

6. A metal-air electrochemical cell according to claim 4, wherein the fuel is selected from the group consisting of zinc, aluminum, magnesium, manganese, and iron.

7. A metal-air electrochemical cell according to claim 4, wherein the ionically conductive medium is an alkaline aqueous electrolyte solution.

8. A metal-air electrochemical cell according to claim 3, wherein the fuel is selected from the group consisting of an alkaline earth metal, a transition metal, and a post-transition metal.

9. A metal-air electrochemical cell according to claim 8, wherein the ionically conductive medium is an alkaline aqueous electrolyte solution.

10. A metal-air electrochemical cell according to claim 3, wherein the fuel is selected from the group consisting of zinc, aluminum, magnesium, manganese, and iron.

11. A metal-air electrochemical cell according to claim 10, wherein the ionically conductive medium is an alkaline aqueous electrolyte solution.

12. A metal-air electrochemical cell according to claim 3, wherein the ionically conductive medium is an alkaline aqueous electrolyte solution.

13. A metal-air electrochemical cell according to claim 2, wherein said controller is configured to switch the one or more switches to switch the cell between the states thereof based on predetermined criteria.

14. A metal-air electrochemical cell according to claim 2, wherein the fuel is selected from the group consisting of an alkaline earth metal, a transition metal, and a post-transition metal.

15. A metal-air electrochemical cell according to claim 2, wherein the fuel is selected from the group consisting of zinc, aluminum, magnesium, manganese, and iron.

16. A metal-air electrochemical cell according to claim 2, wherein the ionically conductive medium is an alkaline aqueous electrolyte solution.

17. A metal-air electrochemical cell according to claim 1, wherein the reversible metal is a nickel species.

18. A metal-air electrochemical cell according to claim 17, wherein the oxidizable species of the nickel is Ni(OH)$_2$ and the reducible species of the nickel is NiOOH.

19. A metal-air electrochemical cell according to claim 18, wherein the fuel is selected from the group consisting of an alkaline earth metal, a transition metal, and a post-transition metal.

20. A metal-air electrochemical cell according to claim 18, wherein the fuel is selected from the group consisting of zinc, aluminum, magnesium, manganese, and iron.

21. A metal-air electrochemical cell according to claim 18, wherein the ionically conductive medium is an alkaline aqueous electrolyte solution.

22. A metal-air electrochemical cell according to claim 17, wherein the fuel is selected from the group consisting of an alkaline earth metal, a transition metal, and a post-transition metal.

23. A metal-air electrochemical cell according to claim 22, wherein the ionically conductive medium is an alkaline aqueous electrolyte solution.

24. A metal-air electrochemical cell according to claim 17, wherein the fuel is selected from the group consisting of zinc, aluminum, magnesium, manganese, and iron.

25. A metal-air electrochemical cell according to claim 24, wherein the ionically conductive medium is an alkaline aqueous electrolyte solution.

26. A metal-air electrochemical cell according to claim 17, wherein the ionically conductive medium is an alkaline aqueous electrolyte solution.

27. A metal-air electrochemical cell according to claim 1, wherein said controller is configured to switch the plurality of switches to switch the cell between the states thereof based on predetermined criteria.

28. A metal-air electrochemical cell according to claim 1, wherein the fuel is selected from the group consisting of an alkaline earth metal, a transition metal, and a post-transition metal.

29. A metal-air electrochemical cell according to claim 1, wherein the fuel is selected from the group consisting of zinc, aluminum, magnesium, manganese, and iron.

30. A metal-air electrochemical cell according to claim 1, wherein the ionically conductive medium is an alkaline aqueous electrolyte solution.

31. A metal-air electrochemical cell for storing electrical energy from a power source and supplying electrical energy to a load, comprising:
a plurality of electrodes comprising a fuel electrode comprising a metal fuel and an air electrode for exposure to an oxygen source, wherein an electrode of the plurality other than the fuel electrode and the air electrode comprises a reversible metal capable of reversible oxidation to a reducible species thereof and reduction to an oxidizable species thereof, and wherein an electrode of the plurality other than the fuel electrode and the air electrode has an oxygen evolving functionality;
the fuel electrode being separate from the other said electrodes, and the air electrode being separate from the other said electrodes, and the electrode comprising the reversible metal and the oxygen evolving electrode being separate electrodes from each other;
an ionically conductive medium for conducting ions among the plurality of electrodes;
the oxidizable species of the reversible metal being oxidizable to the reducible species at a potential cathodic of the potential for oxygen evolution, and the reducible species being reducible to the oxidizable species at a potential anodic of the potential for oxygen reduction at the air electrode;

one or more switches coupled to the air, oxygen evolving and reversible metal electrodes for selective connection to and disconnection from the power source and load to establish the following states of operation for the cell:
  (i) a standard recharge state wherein the power source is coupled to the fuel electrode and the oxygen evolving electrode for applying a potential difference therebetween to cause reduction of a reducible species of the metal fuel on the fuel electrode and evolution of oxygen from the ionically conductive medium at the oxygen evolving electrode;
  (ii) a standard discharge state wherein the fuel electrode and the air electrode are coupled to the load such that oxidation of the metal fuel at the fuel electrode and reduction of oxygen from the oxygen source at the air electrode generates a potential difference for outputting current;
  (iii) a high energy efficiency recharge state wherein the power source is coupled to the fuel electrode and the electrode comprising the reversible metal for applying a potential difference therebetween to cause reduction of a reducible species of the metal fuel on the fuel electrode and oxidizing the oxidizable species of the reversible metal, if present, to the reducible species thereof with the potential of the electrode comprising the reversible metal being cathodic of the potential for oxygen evolution; and
  (iv) a high energy efficiency discharge state wherein the fuel electrode and the electrode comprising the reversible metal are coupled to the load such that oxidation of the metal fuel at the fuel electrode and reduction of the reducible species of the reversible metal, if present, to the oxidizable species thereof generates a potential difference for outputting current with the potential of the electrode reversible metal being anodic of the potential for oxygen reduction at the air electrode;
  wherein an energy efficiency of the high energy efficiency discharge and recharge states is greater than an energy efficiency of the standard discharge and recharge states, each energy efficiency being the ratio of $q_{out}V_{out}/q_{in}V_{in}$; and
  a controller comprising logic configured to switch the one or more switches to operate the cell in the aforesaid states.

32. A metal-air electrochemical cell according to claim 31, wherein the reversible metal is a nickel species.

33. A metal-air electrochemical cell according to claim 32, wherein the oxidizable species of the nickel is $Ni(OH)_2$ and the reducible species of the nickel is $NiOOH$.

34. A metal-air electrochemical cell according to claim 33, wherein the fuel is selected from the group consisting of an alkaline earth metal, a transition metal, and a post-transition metal.

35. A metal-air electrochemical cell according to claim 33, wherein the fuel is selected from the group consisting of zinc, aluminum, magnesium, manganese, and iron.

36. A metal-air electrochemical cell according to claim 33, wherein the ionically conductive medium is an alkaline aqueous electrolyte solution.

37. A metal-air electrochemical cell according to claim 32, wherein the fuel is selected from the group consisting of an alkaline earth metal, a transition metal, and a post-transition metal.

38. A metal-air electrochemical cell according to claim 37, wherein the ionically conductive medium is an alkaline aqueous electrolyte solution.

39. A metal-air electrochemical cell according to claim 32, wherein the fuel is selected from the group consisting of zinc, aluminum, magnesium, manganese, and iron.

40. A metal-air electrochemical cell according to claim 39, wherein the ionically conductive medium is an alkaline aqueous electrolyte solution.

41. A metal-air electrochemical cell according to claim 31, wherein said controller is configured to switch the one or more switches to switch the cell between the states thereof based on predetermined criteria.

42. A metal-air electrochemical cell according to claim 31, wherein the fuel is selected from the group consisting of an alkaline earth metal, a transition metal, and a post-transition metal.

43. A metal-air electrochemical cell according to claim 31, wherein the fuel is selected from the group consisting of zinc, aluminum, magnesium, manganese, and iron.

44. A metal-air electrochemical cell according to claim 31, wherein the ionically conductive medium is an alkaline aqueous electrolyte solution.

45. A metal-air electrochemical cell according to claim 32, wherein the ionically conductive medium is an alkaline aqueous electrolyte solution.

46. A method for operating an electrochemical cell for storing energy from a power source and supplying energy to a load, the cell comprising a plurality of electrodes comprising a fuel electrode comprising a metal fuel and an air electrode, wherein an electrode of the plurality other than the fuel electrode comprises a reversible metal capable of reversible oxidation to a reducible species thereof and reduction to an oxidizable species thereof, and wherein an electrode of the plurality other than the fuel electrode has an oxygen evolving functionality; the method comprising:
  operating the cell in the following states:
  (i) a standard recharge state wherein the power source is coupled to the fuel electrode and the oxygen evolving electrode for applying a potential difference therebetween to cause reduction of a reducible species of the metal fuel on the fuel electrode and evolution of oxygen from the ionically conductive medium at the oxygen evolving electrode;
  (ii) a standard discharge state wherein the fuel electrode and the air electrode are coupled to the load such that oxidation of the metal fuel at the fuel electrode and reduction of oxygen from the oxygen source at the air electrode generates a potential difference for outputting current;
  (iii) a high energy efficiency recharge state wherein the power source is coupled to the fuel electrode and the electrode comprising the reversible metal for applying a potential difference therebetween to cause reduction of a reducible species of the metal fuel on the fuel electrode and oxidizing the oxidizable species of the reversible metal, if present, to the reducible species thereof with the potential of the electrode comprising the reversible metal being cathodic of the potential for oxygen evolution; and
  (iv) a high energy efficiency discharge state wherein the fuel electrode and the electrode comprising the reversible metal are coupled to the load such that oxidation of the metal fuel at the fuel electrode and reduction of the reducible species of the reversible metal, if present, to the oxidizable species thereof generates a potential difference for outputting current with the potential of the electrode reversible metal being anodic of the potential for oxygen reduction at the air electrode;
  wherein an energy efficiency of the high energy efficiency discharge and recharge states is greater than an energy efficiency of the standard discharge and recharge states, each energy efficiency being the ratio of $q_{out}V_{out}/q_{in}V_{in}$, wherein the electrode comprising the reversible metal and the oxygen evolving electrode are the same electrode which is a tri-functional electrode separate from both the fuel electrode and the air electrode; and wherein operating the cell in the standard and high efficiency recharge states comprises operating the cell in a recharge state coupling the power source to the fuel electrode and the tri-functional electrode such that the recharge state includes (a) initially the high energy recharge state in which oxidation at the tri-functional electrode is predominated by oxidation of the oxidizable species of the reversible metal, if present, to the reducible species thereof with the potential of the tri-functional electrode being cathodic of the potential for oxygen evolution, and (b) then the standard recharge state in which the oxidation at the tri-functional electrode is predominated by evolution of oxygen from the ionically conductive medium.

47. A method for operating an electrochemical cell for storing energy from a power source and supplying energy to a load, the cell comprising a plurality of electrodes comprising a fuel electrode comprising a metal fuel and an air electrode, wherein an electrode of the plurality other than the fuel electrode comprises a reversible metal capable of reversible oxidation to a reducible species thereof and reduction to an oxidizable species thereof, and wherein an electrode of the plurality other than the fuel electrode has an oxygen evolving functionality; the method comprising:

operating the cell in the following states:
(i) a standard recharge state wherein the power source is coupled to the fuel electrode and the oxygen evolving electrode for applying a potential difference therebetween to cause reduction of a reducible species of the metal fuel on the fuel electrode and evolution of oxygen from the ionically conductive medium at the oxygen evolving electrode;
(ii) a standard discharge state wherein the fuel electrode and the air electrode are coupled to the load such that oxidation of the metal fuel at the fuel electrode and reduction of oxygen from the oxygen source at the air electrode generates a potential difference for outputting current;
(iii) a high energy efficiency recharge state wherein the power source is coupled to the fuel electrode and the electrode comprising the reversible metal for applying a potential difference therebetween to cause reduction of a reducible species of the metal fuel on the fuel electrode and oxidizing the oxidizable species of the reversible metal, if present, to the reducible species thereof with the potential of the electrode comprising the reversible metal being cathodic of the potential for oxygen evolution; and
(iv) a high energy efficiency discharge state wherein the fuel electrode and the electrode comprising the reversible metal are coupled to the load such that oxidation of the metal fuel at the fuel electrode and reduction of the reducible species of the reversible metal, if present, to the oxidizable species thereof generates a potential difference for outputting current with the potential of the electrode reversible metal being anodic of the potential for oxygen reduction at the air electrode; wherein an energy efficiency of the high energy efficiency discharge and recharge states is greater than an energy efficiency of the standard discharge and recharge states, each energy efficiency being the ratio of $q_{out}V_{out}/q_{in}V_{in}$, wherein the electrode comprising the reversible metal and the oxygen evolving electrode are separate electrodes and are each separate from both the fuel electrode and the air electrode.

* * * * *